(12) United States Patent
Schlotthauer

(10) Patent No.: US 12,329,134 B2
(45) Date of Patent: Jun. 17, 2025

(54) AUTOMATIC FEEDER WITH ADJUSTABLE RATIONING FOR MULTIPLE ANIMALS

(71) Applicant: Burly Products, Inc., Post Falls, ID (US)

(72) Inventor: Ross Schlotthauer, Post Falls, ID (US)

(73) Assignee: Burly Products, Inc., Post Falls, ID (US)

( * ) Notice: Subject to any disclaimer, the term of this patent is extended or adjusted under 35 U.S.C. 154(b) by 356 days.

(21) Appl. No.: 17/143,856

(22) Filed: Jan. 7, 2021

(65) Prior Publication Data
US 2022/0211001 A1    Jul. 7, 2022

(51) Int. Cl.
*A01K 5/02*    (2006.01)

(52) U.S. Cl.
CPC .......... *A01K 5/0291* (2013.01); *A01K 5/0225* (2013.01); *A01K 5/0275* (2013.01)

(58) Field of Classification Search
CPC .. A01K 5/0291; A01K 5/0225; A01K 5/0275; A01K 5/02; G01F 11/268
USPC .......................................................... 119/53
See application file for complete search history.

(56) References Cited

U.S. PATENT DOCUMENTS

| | | | | |
|---|---|---|---|---|
| 2,914,023 A | * | 11/1959 | St Pierre | A01K 5/0225 119/57.4 |
| 2,959,154 A | * | 11/1960 | Quincy | A01K 5/0225 119/59 |
| 3,088,437 A | * | 5/1963 | Willems | A01K 5/0275 119/56.1 |
| 3,213,829 A | * | 10/1965 | Zumbahlen | A01K 5/0225 119/56.1 |

(Continued)

FOREIGN PATENT DOCUMENTS

| | | | | |
|---|---|---|---|---|
| CN | 111567419 A | | 8/2020 | |
| FR | 2675338 A1 | * | 10/1992 | ........... A01K 5/0275 |

(Continued)

OTHER PUBLICATIONS

Machine translation of FR 2675338 A1 (Year: 2024).*
The International Preliminary Report on Patentability for PCT Application No. PCT/US22/11556, mailed Apr. 12, 2022, 12 pages.

*Primary Examiner* — Peter M Poon
*Assistant Examiner* — Hae Rie Jessica Byun
(74) *Attorney, Agent, or Firm* — Taylor English Duma L.L.P.

(57) ABSTRACT

Techniques for automatic feeder apparatuses with adjustable rationing for multiple animals are disclosed herein. An example apparatus may include a hopper and a feeder housing. The feeder housing may include a first portion that is coupled to the hopper. The first portion may include a motor assembly that is configured to distribute contents stored within the hopper. The feeder housing may also include a second portion that is disposed below the first portion. The second portion may include at least a first compartment and a second compartment. Additionally, the second portion may include an interior panel that separates the first compartment and the second compartment. The interior panel may be configured to translate between a first side and a second side of the feeder housing to adjust a first volume of the contents received by the first compartment and a second volume of the contents received by the second compartment.

19 Claims, 10 Drawing Sheets

(56) References Cited

U.S. PATENT DOCUMENTS

| | | | | |
|---|---|---|---|---|
| 5,046,455 | A | * | 9/1991 | Christiansen ........ A01K 5/0291 222/444 |
| 5,640,926 | A | * | 6/1997 | Kleinsasser .......... A01K 5/0225 119/53 |
| 2010/0107983 | A1 | * | 5/2010 | Gates ................... A01K 5/0225 119/53 |
| 2010/0307421 | A1 | * | 12/2010 | Gates ................... A01K 5/0225 119/57.91 |
| 2011/0297092 | A1 | | 12/2011 | Lato |
| 2015/0189855 | A1 | * | 7/2015 | Norris ................. A01K 5/0275 119/57.1 |
| 2017/0029221 | A1 | | 2/2017 | Kojima |
| 2017/0150698 | A1 | | 6/2017 | Zaidi et al. |
| 2019/0029221 | A1 | | 1/2019 | Anderton et al. |
| 2021/0127630 | A1 | * | 5/2021 | Zimmerman ......... A61B 5/1118 |
| 2021/0153455 | A1 | * | 5/2021 | Snell ..................... A01K 7/025 |

FOREIGN PATENT DOCUMENTS

| | | | | |
|---|---|---|---|---|
| KR | 20030048639 A | | 6/2003 | |
| WO | WO-2010079328 A1 | * | 7/2010 | ........... A01K 5/0291 |

* cited by examiner

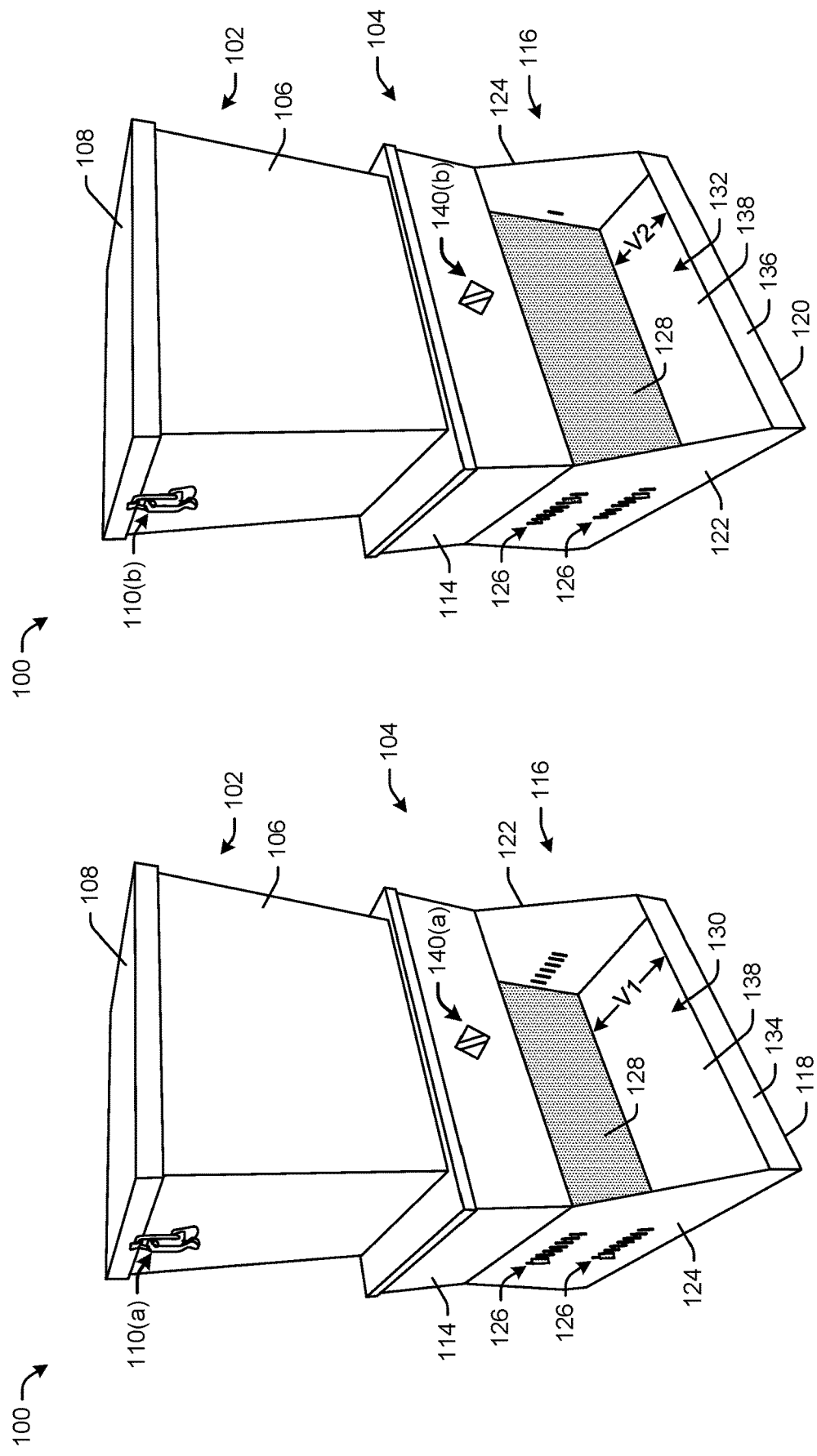

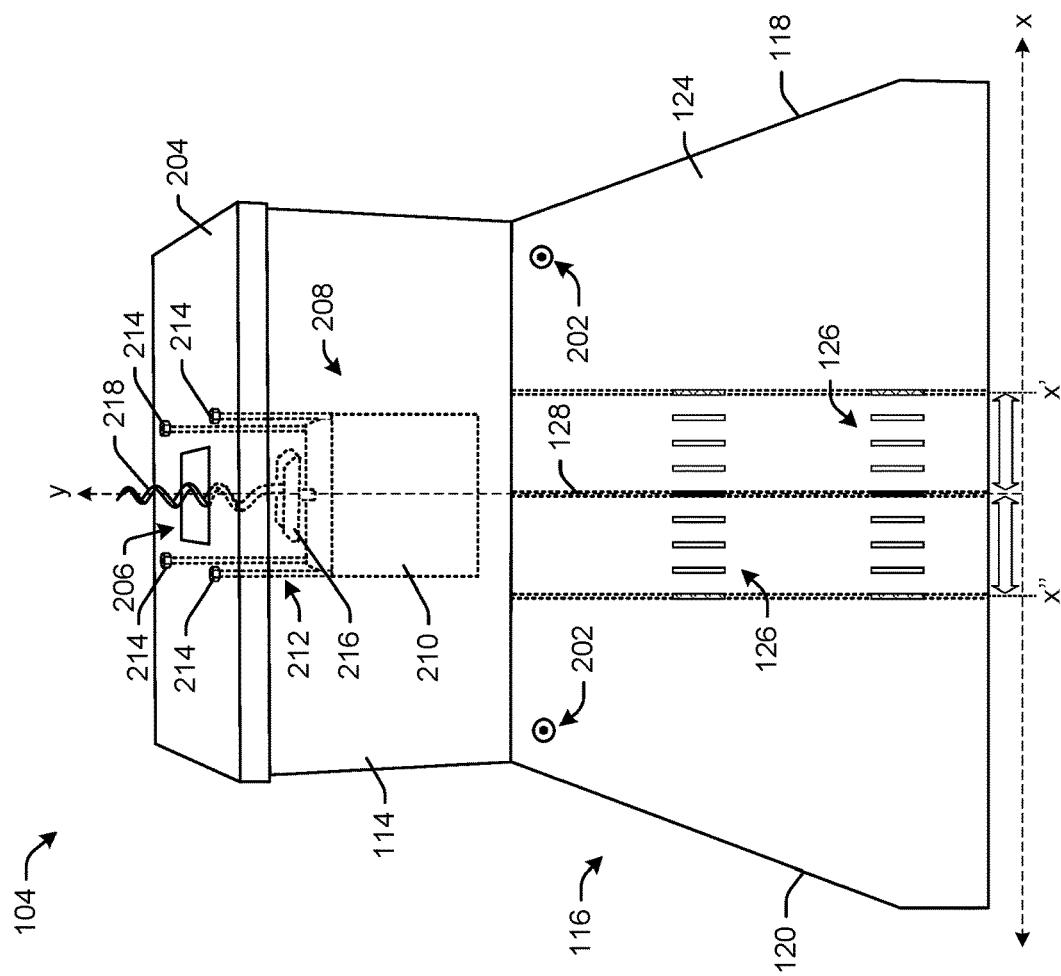
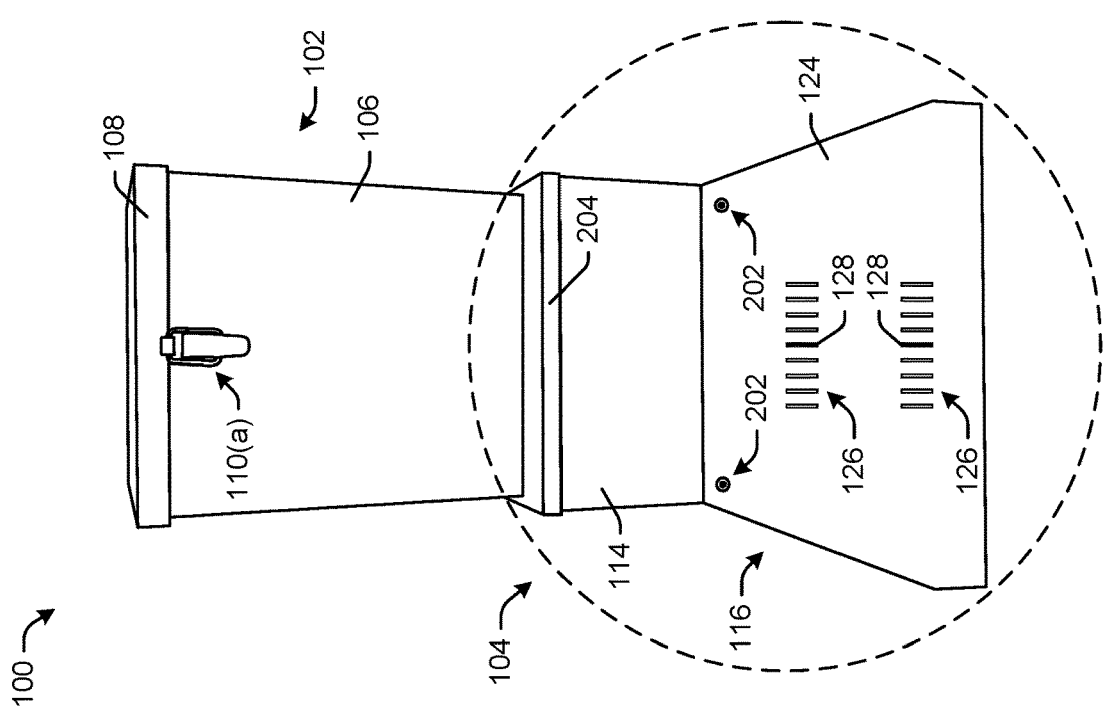
FIG. 2

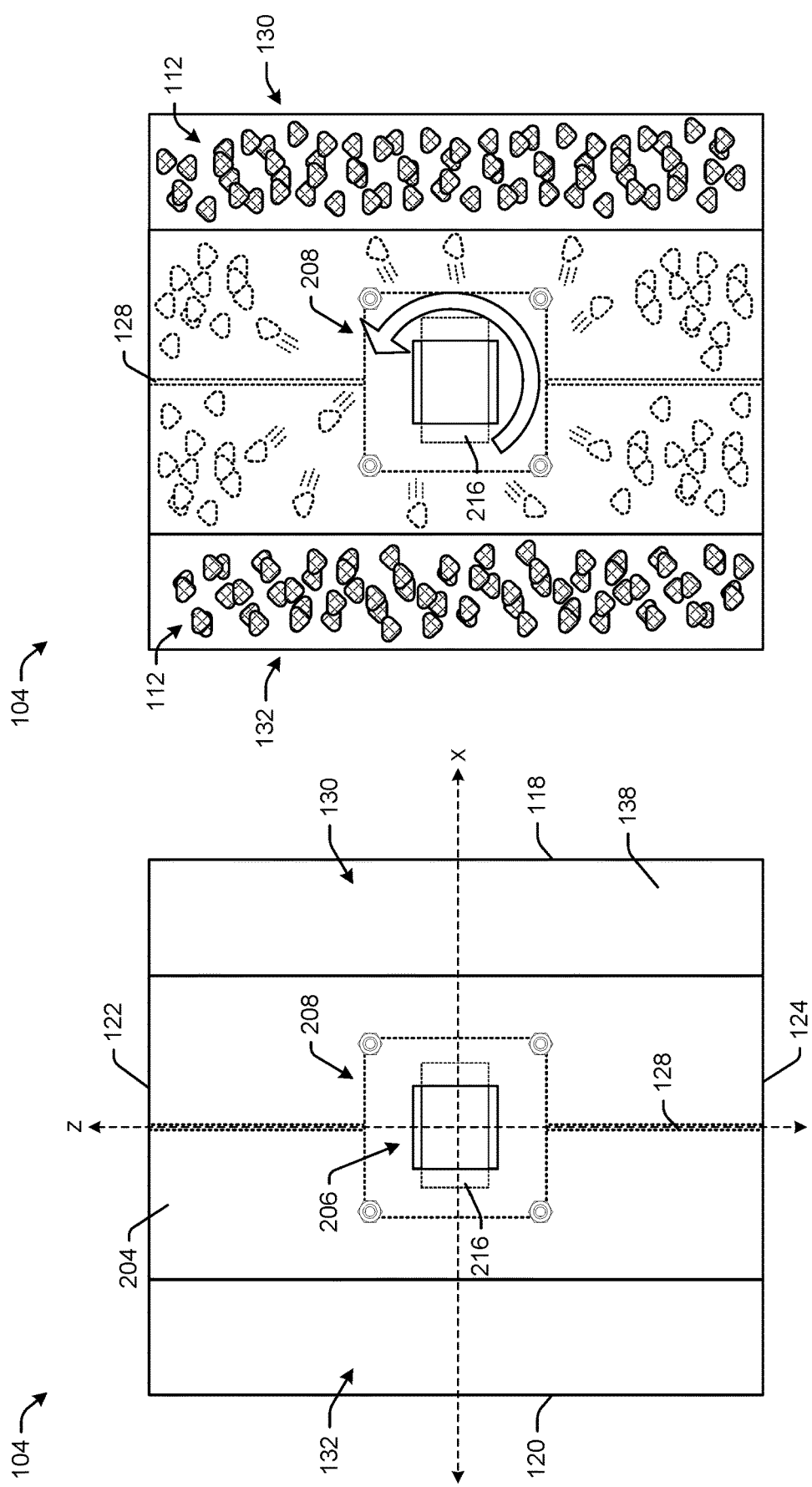

AUTOMATIC FEEDER WITH ADJUSTABLE RATIONING FOR MULTIPLE ANIMALS

BACKGROUND

In general, animals may consume food or other substances multiple times throughout a day. As with humans, studies have shown that health benefits exist when an animal consumes multiple meals throughout a day, as opposed to consuming the same amount of food in fewer meals. Typically, however, animals are fed 1-2 meals per day when their owner is present. For instance, if an animal's owner is away from home during general business hours, the animal may be fed once in the morning before the owner leaves and again in the evening when the owner returns. Additionally, if an owner is away from home or otherwise unable to feed their animal at its usual time, arrangements must be made to make sure the animal is fed and does not go hungry.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 1A-1C illustrate various perspective views of an example automatic feeder apparatus.

FIG. 2 illustrates a side view of an example automatic feeder apparatus.

FIG. 3A illustrates a top-down view of an example feeder housing.

FIG. 3B illustrates a top-down view of the example feeder housing as it distributes contents.

DETAILED DESCRIPTION

Figure 1C:
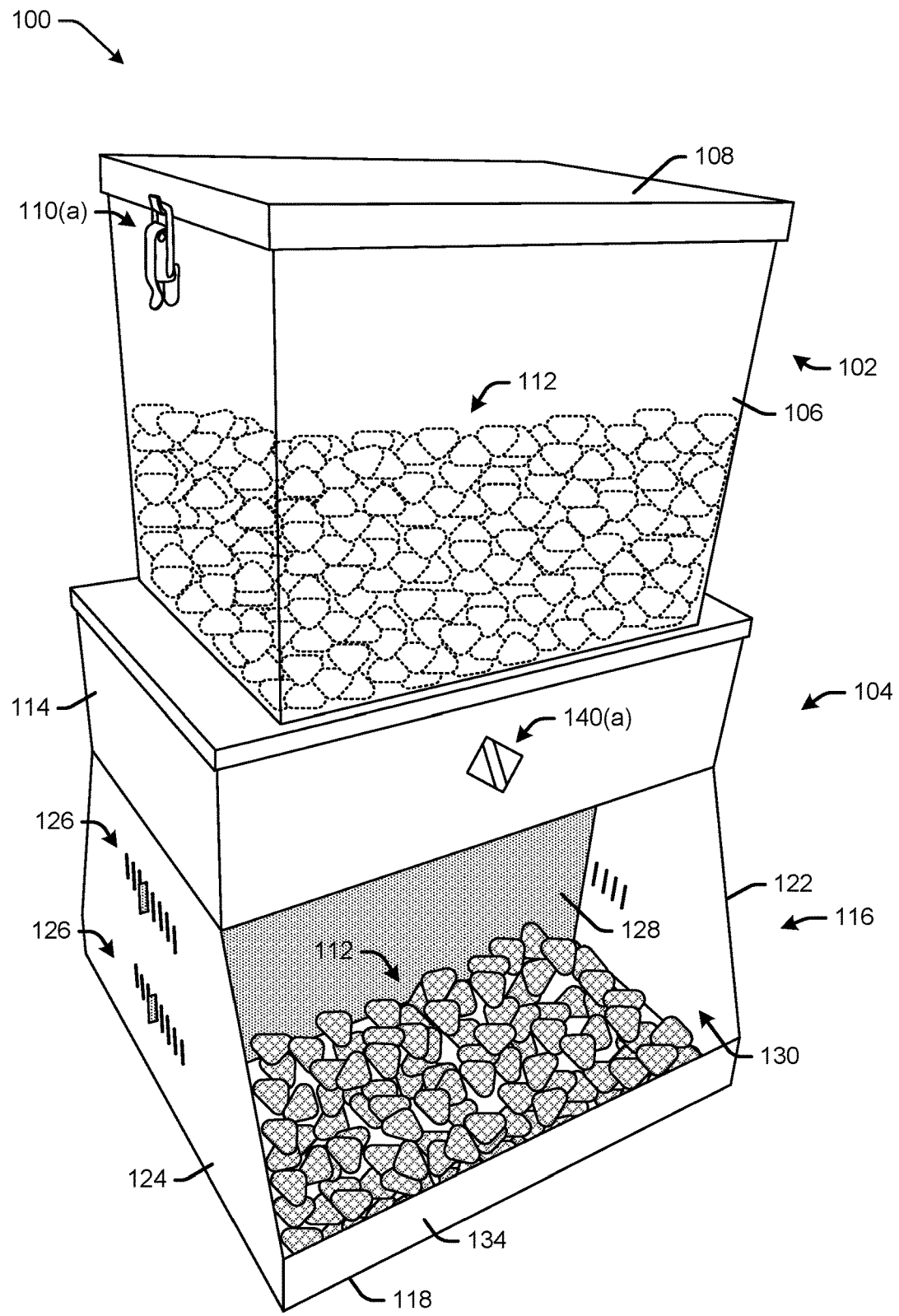

As discussed above, domesticated animals typically fed 1-2 meals per day when their owner is present. However, health benefits exist when an animal consumes multiple meals throughout a day, as opposed to consuming the same amount of food in fewer meals. Additionally, if an owner is away from home or otherwise unable to feed their animal at its usual time, arrangements must be made to make sure the animal is fed and does not go hungry.

In some cases, gravity-assisted feeding systems have helped solve some of the above noted problems. However, these systems generally do not allow proper rationing of food for an animal. That is, in these previous systems, an animal is able to come and go as they please and eat as much food as they would like. This results in animals being overfed and/or overweight. Additionally, when these systems are used to feed multiple animals, one animal of the multiple animals may consume more or less food than another animal, and/or may consume the other animal's ration. In the case of animals that live outside of a home or otherwise remain outside while their owner is away, if these animals are underfed, they may tend to run away in search of more food.

Accordingly, this disclosure relates to an automatic animal feeder apparatus with adjustable rationing to feed multiple animals. In some examples, the animal feeder apparatus may include a hopper for storing contents (e.g., food, water, supplements, etc.) and a feeder housing. The feeder housing may include a first portion that is coupled to the hopper and includes a motor assembly for distributing the contents stored within the hopper. Additionally, the feeder housing may include a second portion that is disposed below the first portion. In some instances, the second portion may comprise one or more feed compartments. For instance, the second portion may include a first feed compartment and a second feed compartment. Further, the second portion of the feeder housing may comprise an interior panel that separates the first feed compartment and the second feed compartment (e.g., the interior panel forms a shared wall between the first feed compartment and the second feed compartment). In some examples, the interior panel may be configured to adjust a first volume of the first feed compartment and/or the contents received by the first feed compartment and a second volume of second feed compartment and/or the contents received by the second feed compartment. For instance, the interior panel may be configured to translate between a first side of the feeder housing and a second side of the feeder housing that is opposite the first side in order to adjust the first volume and the second volume. In this way, different volumes of contents may be received by different feed compartments such that a first animal associated with the first feed compartment may consume a first volume of the contents, a second animal associated with the second feed compartment may consume a second volume of the contents, and so forth. Additionally, the different volumes of contents may be received by the different feed compartments substantially simultaneously. This helps prevent one animal from eating another animal's food because both animals will be able to consume their food at substantially the same time.

According to the apparatuses and/or techniques described in this disclosure, an improved automatic animal feeder with adjustable rationing to feed multiple animals may be realized. For instance, the improved automatic animal feeder apparatus described herein may enable a user to feed his or her animals smaller portions of food more frequently throughout a day without having to be present to do so. Additionally, since the improved automatic animal feeder includes one or more adjustable interior panels for adjusting feed compartment volumes and separating different feed compartments, multiple animals may be fed at once to reduce the risk of animals being overfed or underfed. Further, in the cases of animals who are kept outside, the improved automatic animal feeder helps animals stay closer to home and keep from running away. This is because the animals may become accustomed to the various times of day when they are fed, and the animals will tend to stay closer to the automatic animal feeder so that they do not miss their ration. Even further, the automatic animal feeder may include functionality to help animals eat slower. For instance, the motor assembly of the automatic animal feeder may be adjusted so that small portions of contents are distributed in series during a feed cycle. In this way, an animal may finish a first small portion of contents before the motor assembly distributes a second small portion of contents, and so forth. This helps promote safer and healthier eating by preventing animals from choking on their food while their owner is not present.

By way of example and not limitation, an apparatus according to the various techniques described in this disclosure may include a hopper for storing contents (e.g., food, water, supplements, etc.). The hopper may include a lid and one or more latches or fasteners for securing the lid to the hopper to seal the hopper from environmental conditions, pests, insects, and the like. In some examples, the hopper may include a funnel that is stored within the hopper or otherwise integrated into the hopper. The funnel may help in facilitating the flow of contents stored within the hopper through an outlet of the hopper. Contents stored in the hopper may gravity feed through the outlet of the hopper in a first direction and into the feeder housing.

In some examples, the apparatus may include a feeder housing. The feeder housing may be disposed below the hopper such that the contents stored within the hopper may gravity feed from the hopper and into the feeder housing. In some instances, a top portion of the feeder housing may be coupled to a bottom portion of the hopper, and an outlet of the hopper may be lined up with an inlet of the feeder housing. The feeder housing may include a first portion (e.g., an upper compartment) and second portion (e.g., a lower compartment).

In various examples, the first portion of the feeder housing may be coupled to the hopper. Additionally, the first portion of the feeder housing may include a motor assembly that, among other things, is configured to distribute the contents stored within the hopper. In some instances, the motor assembly, when actuated, may distribute the contents stored within the hopper in a second direction that is substantially perpendicular to the first direction (e.g., the first direction in which the contents flow from the hopper and into the feeder housing). For instance, the motor assembly may comprise a broadcast feeder motor that includes a DC (direct current) motor with a shaft oriented about an axis such that a plate coupled to the shaft may broadcast or distribute contents across a plane when a voltage or current is input into the DC motor. In additional or alternative examples, the motor assembly may include one or more processors and memory communicatively coupled to the one or more processors. The memory may comprise non-transitory computer-readable media storing instructions that, when executed by the one or more processors, cause at least one of the motor assembly or the one or more processors to perform various operations described in this disclosure. Further detail with respect to the motor assembly will be discussed below.

In some instances, the second portion of the feeder housing may be disposed below the first portion. In this way, the motor assembly of the first portion may distribute contents into the second portion, and the second portion may receive the distributed contents. The second portion of the feeder housing may comprise one or more compartments and/or sub-compartments. For instance, the second portion of the feeder housing may comprise a first compartment and a second compartment. However, any number of compartments and/or sub-compartments are possible. In some examples, each individual compartment and/or sub-compartment may include an opening to access contents received by the individual compartment or sub-compartment.

In some examples, the second portion of the feeder housing may include an interior panel or divider. The interior panel may separate the first compartment and the second compartment. In other words, the interior panel may separate the second portion into one or more sub-compartments, the one or more sub-compartments including at least a first sub-compartment and a second sub-compartment. Additionally, in some instances the interior panel may be configured to adjust volumes or capacities of the one or more compartments and/or quantities of contents received by the one or more compartments. For instance, the interior panel may be configured to adjust a first volume of the first compartment and/or a first quantity of contents received by the first compartment and a second volume of the second compartment and/or a second quantity of contents received by the second compartment. Accordingly, the interior panel may be configured to translate between a first side of the feeder housing and a second side of the feeder housing (e.g., a first side of the second portion and a second side of the second portion that is opposite the first side) to adjust a volume or capacity of a compartment. The first side of the feeder housing may include a first opening to access the contents received by the first compartment and the second side of the feeder housing may include a second opening to access the contents received by the second compartment.

In some examples, the second portion of the feeder housing may include multiple sides. For instance, the second portion of the feeder housing may include the first side and the second side, as well as a third side and a fourth side. The third side and the fourth side may each include a set of connection points and be oriented substantially parallel to one another. As such, in some examples the interior panel may be disposed between, and at an angle substantially perpendicular to, the third side and the fourth side. Additionally, or alternatively, the interior panel may be configured to removably couple with the third side and the fourth side via the sets of connection points of the third side and the fourth side.

In some examples, the second portion of the feeder housing may include a base panel. Additionally, in some examples the first side of the second portion may comprise a first flange extending upward from the base panel and to the bottom of the first opening allowing access into the first compartment. Further, the second side of the second portion may include a second flange that extends upward from the base panel and to the bottom of the second opening allowing access into the second compartment. In this way, the first flange and the second flange may facilitate in maintaining contents within the first compartment and the second compartment, while also allowing access into the compartments so that animals may feed.

In some examples, the apparatus and/or the motor assembly of the apparatus may include one or more processors and memory that is communicatively coupled to the one or more processors. In some examples, the memory may comprise non-transitory computer-readable media storing instructions that, when executed by the one or more processors, cause the one or more processors and/or the motor assembly to perform various operations. For instance, the operations may include one or more of establishing a wireless connection with an electronic device (e.g., mobile device, tablet, computer, electronic collar worn by an animal, etc.), receiving, via the wireless connection, an indication of a period of time during which the motor assembly is to distribute the contents, and/or sending a signal to the motor assembly during the period of time to cause the motor assembly to distribute the contents. For instance, a mobile device may execute an application that is configured to control various components of the apparatus, and a communication connection that is communicatively coupled to the one or more processors may enable communication of data between the mobile device and the one or more processors.

Additionally, or alternatively, the operations may include one or more of determining at least one of a predicted time or a predicted date at which contents stored within the hopper are to be replenished and sending an indication of the at least one of the predicted time or the predicted date to an electronic device. For instance, the predicted time and/or predicted date may be calculated based at least in part on a quantity of contents stored in the hopper and an amount of time the motor assembly is actuated each day. Additionally, or alternatively, the predicted time and/or predicted date may be determined based at least in part on a weight of the contents stored within the hopper. For instance, sensor data indicative of a current weight of the contents stored within the hopper may be received, and the predicted time and/or predicted date may be determined based at least in part on the sensor data.

In some examples, the apparatus may include one or more sensors (e.g., proximity sensors, light sensors, weight sensors, image sensors, microphones, cameras, motion sensors, and the like). In at least one example, a sensor of the one or more sensors may be disposed proximate the first compartment. Accordingly, sensor data representing a proximity of an electronic device (e.g., an electronic collar worn by an animal) with respect to the first compartment may be received. In this way, it may be determined whether the electronic device is within a threshold proximity and, based at least in part on the proximity of the electronic device being within the threshold proximity, a signal may be sent to the electronic device to cause the electronic device to perform an action (e.g., emit a sound, vibrate, electrically stimulate the animal, etc.). For instance, if the first compartment is associated with a first electronic device and/or a first animal, and a second electronic device and/or second animal is within the threshold proximity of the first compartment (e.g., the second animal is eating from the first compartment), then the signal may be sent to the second electronic device to cause the second electronic device to perform the action. This can help prevent one animal from eating another animal's food. Similarly, if the electronic device is within the threshold proximity but is authorized to be within the threshold proximity, then the system may refrain from causing the electronic device to perform the action.

These and other aspects are described further below with reference to the accompanying drawings. The drawings are merely example implementations and should not be construed to limit the scope of the claims. For example, while the example apparatuses and systems are mainly shown as including two feed compartments, it is contemplated that the apparatuses may include more or less feed compartments. Additionally, it is contemplated that the example apparatuses may comprise different shapes and/or configurations than those shown in the example figures.

Example Automatic Feeder Technologies

FIGS. 1A-1C illustrate various perspective views of an example automatic feeder apparatus 100. FIG. 1A illustrates a first perspective view of the example automatic feeder apparatus 100, FIG. 1B illustrates a second perspective view of the example automatic feeder apparatus 100 from the opposite viewpoint of the first perspective (e.g., the opposite side of the feeder apparatus 100 from that shown in FIG. 1A), and FIG. 1C illustrates a third perspective view of the example automatic feeder apparatus 100.

The example feeder apparatus 100 includes a hopper 102 that is coupled to a feeder housing 104. The hopper 102 may include a body portion 106, a lid 108, and one or more latches 110(a) and 110(b) (hereinafter referred to collectively as "latches 110") for securing the lid 108 to the body portion 106 of the hopper 102. In this way, contents 112 stored within the hopper 102 may be sealed from the elements, pests, insects, animals, and the like.

The feeder housing 104 may include a first portion 114 that is disposed above a second portion 116. The first portion 114 may include or otherwise house a motor assembly that, when actuated, distributes at least a portion of the contents 112 into the second portion 116. The first portion 114 may be coupled to the hopper 102 and the second portion 116. The feeder housing 104 may include a first side 118, a second side 120 opposite the first side 118, a third side 122 disposed between the first side 118 and the second side 120, and a fourth side 124 opposite the third side 122 and disposed between the first side 118 and the second side 120. The third side 122 and the fourth side 124 may each include one or more sets of connection points 126. The connection points 126 may be configured to removably couple an interior panel 128 with the third side 122 and the fourth side 124. In this way, the interior panel 128 may translate between the first side 118 and the second side 120 to adjust a first volume "V1" associated with a first compartment 130 and a second volume "V2" associated with a second compartment 132. As shown in FIGS. 1A and 1B, the first volume V1 of the first compartment 130 is greater than the second volume V2 of the second compartment 132.

The first side 118 of the second portion 116 may include a first flange 134 and the second side 120 of the second portion 116 may include a second flange 136. The first flange 134 and the second flange 136 may extend upward from a base 138 of the second portion to secure contents 112 within the first compartment 130 and the second compartment 132. The first side 118 may further include a first opening between the first flange 134 and the first portion 114 to provide access to the first compartment 130. Likewise, the second side 120 may include a second opening between the second flange 136 and the first portion 114 to provide access to the second compartment 132.

Additionally, the automatic feeder apparatus 100 may include one or more sensors 140(a) and 140(b) (hereinafter referred to collectively as "sensors 140"). The sensors 140 may comprise one or more of image sensors, proximity sensors, motion sensors, weight sensors, microphones, Radio-Frequency Identification (RFID) sensors, photosensors, and the like.

FIG. 2 illustrates a side view of the example automatic feeder apparatus 100 including additional example detail of the feeder housing 104. As shown in broken lines, the interior panel 128 may be oriented vertically about an axis "y" and may translate along an axis "x" between a first side 118 and a second side 120 of the feeder housing 104. In this way, the interior panel 128 may be adjusted a total distance between x' and x" using the connection points 126.

In some examples, the third side 124 (and likewise, the fourth side 126) may be coupled to the first portion 114 with one or more fasteners 202. In some instances, the fasteners 202 may be removed to access and/or adjust the interior panel 128 and/or the motor assembly 208.

The first portion 114 of the feeder housing 104 may include a top portion 204. The top portion 204 may include an inlet 206 such that contents stored within the hopper 102 may flow, via the inlet 206, through the top portion 204 and into the first portion 114 of the feeder housing 104. In some examples, the motor assembly 208 that is housed within the first portion 114 may include a motor housing 210, motor mounts 212 and nuts 214 for securing the motor assembly 208 to the top portion 204, a spin plate 216, and an agitator 218. The agitator 218 may be coupled to the spin plate 216. In some examples, when the motor assembly 208 is actuated, the spin plate 216 may rotate about the axis "y" to distribute contents in a direction substantially parallel with the axis "x." Additionally, the agitator 218 may rotate about the axis "y" to ensure that contents stored within the hopper 102 flow into the feeder housing 104. In this way, the agitator 218 may extend vertically from a base of the spin plate 216 and upward through the inlet 206 and into a portion of the hopper 102. The agitator 218 may comprise a shape similar to that of a corkscrew, auger, a rectangular plate, and the like. In some examples, the spin plate 216 may further include a counterweight that causes the motor assembly 208 to vibrate and/or shake in order to help reduce clogging of contents in the hopper 102 and/or the inlet 206. For instance, the counterweight may be disposed on a surface of the spin plate 216 at a distance away from a shaft of the motor assembly 208 that may connect the spin plate 216 to the motor assembly 208.

FIG. 3A illustrates a top-down view of the example feeder housing 104. The example feeder housing 104 includes the first side 118, the second side 120, the third side 122, the fourth side 124, the interior panel 128 separating the first compartment 130 from the second compartment 132, and the base 138. Also shown in FIG. 3A is the top portion 204 of the feeder housing 104, the inlet 206 of the top portion 204, the motor assembly 208, and the spin plate 216 of the motor assembly 208.

As shown, the interior panel 128 is coupled to the third side 122 and the fourth side 124 at an angle perpendicular to the third side 122 and the fourth side 124 along an axis "z." Additionally, the interior panel 128 is disposed between the first compartment 130 and the second compartment 132 and is configured to translate between the first side 118 and the second side 120 along an axis "x."

The spin plate 216 and the motor assembly 208 may be positioned substantially centered under the inlet 206 of the top portion 204 (e.g., at the intersection of the axis "x" and "z"). In this way, contents 112 that enter the feeder housing 104 from a hopper may collect on top of the spin plate 216. Additionally, the motor assembly 208 and/or the spin plate 216 may be positioned at a specific depth below the top of the top portion 204 to ensure that contents 112 from the hopper do not fall into the first compartment 130 or the second compartment 132 when the motor assembly 208 is not actuated.

FIG. 3B illustrates a top-down view of the example feeder housing 104 as it distributes contents 112. For instance, the contents 112 may enter the feeder housing 104 through the inlet 206 and collect on top of the spin plate 216. In this way, when the motor assembly 208 actuates, the spin plate 216 may spin as shown in FIG. 3B and distribute the contents 112 into the first compartment 130 and the second compartment 132.

Figure 4A:
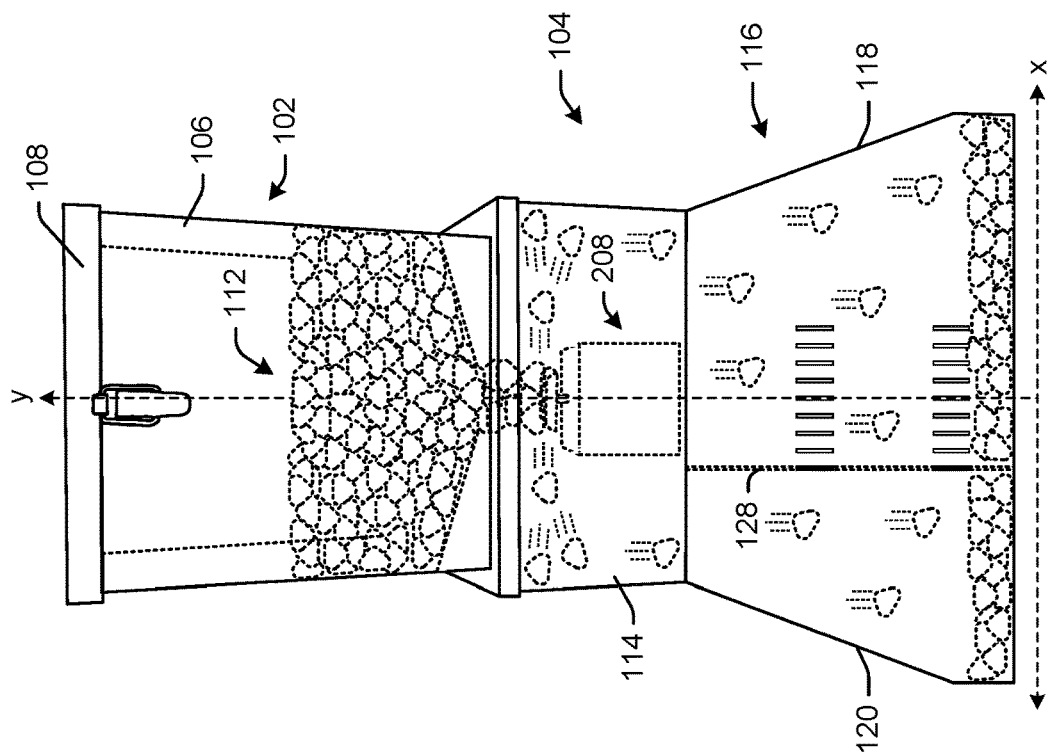
FIG. 4A illustrates a side view of an example automatic feeder apparatus.

FIG. 4A illustrates a side view of an example automatic feeder apparatus 100 including example internal features. For instance, the hopper 102 includes an internal and/or integrated funnel 402 for facilitating flow of contents 112 into the feeder housing 104 via the inlet 206. Additionally, the automatic feeder apparatus 100 includes the motor assembly 208 and the interior panel 128. The agitator 218 of the motor assembly 208 may extend upward from the motor assembly 208 and through the inlet 206 into the hopper 102 to ensure that contents 112 flow freely. The interior panel may be disposed below the first portion 114 and/or the motor assembly 208 such that contents 112 distributed by the motor assembly 208 will be received by the second portion 116 of the automatic feeder apparatus 100 on each side of the interior panel 128, as shown in more detail in FIG. 4B.

Figure 4B:
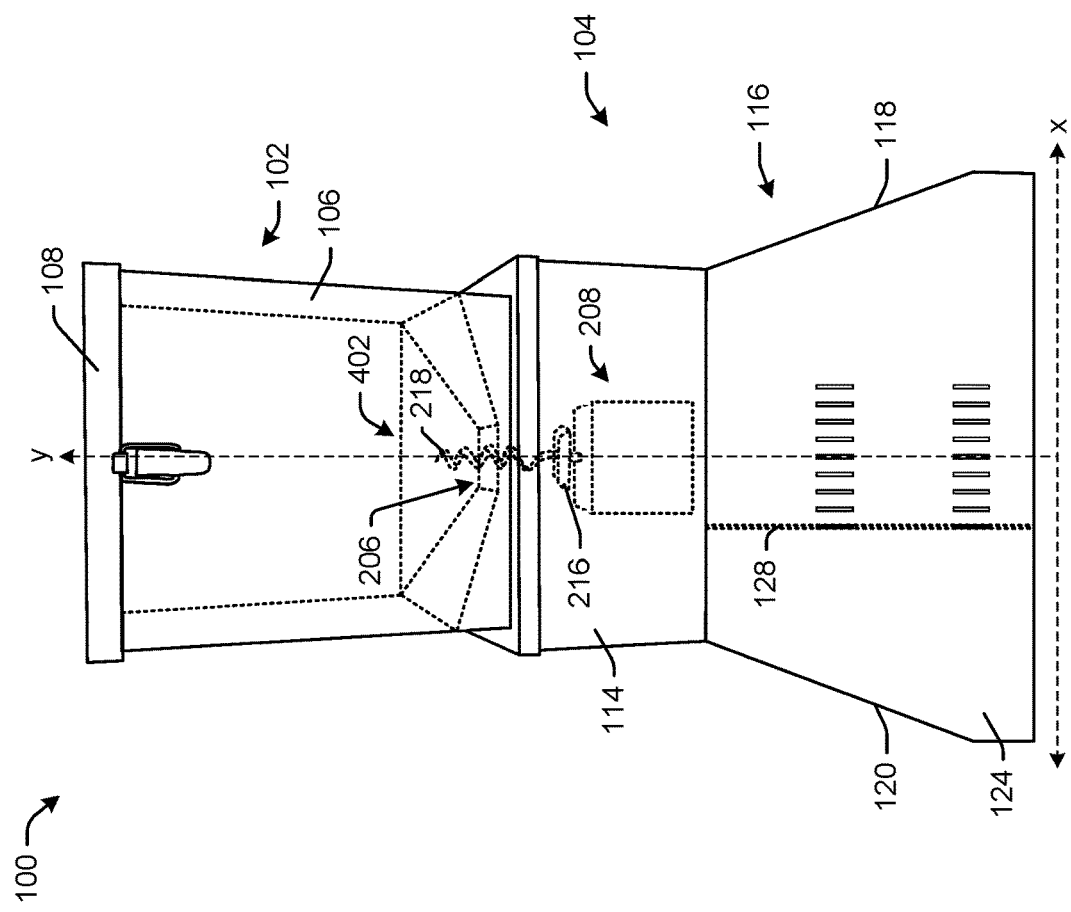
FIG. 4B illustrates a side view of the example automatic feeder apparatus as it distributes contents.

FIG. 4B illustrates a side view of the example automatic feeder apparatus 100 as it distributes contents 112. As shown, depending on the position of the interior panel 128, a volume of the contents 112 that are distributed within the second portion 116 on each side of the interior panel 128 may vary. For instance, as shown in FIG. 4B, the interior panel 128 is fully adjusted toward the second side 120 of the feeder housing 104. This results in less contents being distributed on the second side 120 of the interior panel 128 and more contents being distributed on the first side 118 of the interior panel 128.

Additionally, it is to be appreciated that the contents 112 flow from the hopper 102 and into the first portion 114 of the feeder housing 104 in a vertical direction along an axis "y" and that the motor assembly 208, when actuated, distributes the contents 112 in a perpendicular direction along an axis "x." That is, the contents 112 flow from the hopper 102 and into the first portion 114 of the feeder housing 104 in a first direction, and then the motor assembly 208 distributes the contents 112 in a second direction (e.g., toward the first compartment) and a third direction (e.g., toward the second compartment). Additionally, or alternatively the distribution of the contents 112 by the motor assembly 208 may be characterized as being distributed along a plane formed by the axis "x" and an axis "z," which is not shown. In this way, in some examples the motor assembly 208 may distribute the contents 112 such that the contents 112 make contact with one or more sides of the first portion 114 and then fall into the second portion 116 of the feeder housing 104 on each side of the interior panel 128.

Figure 5:
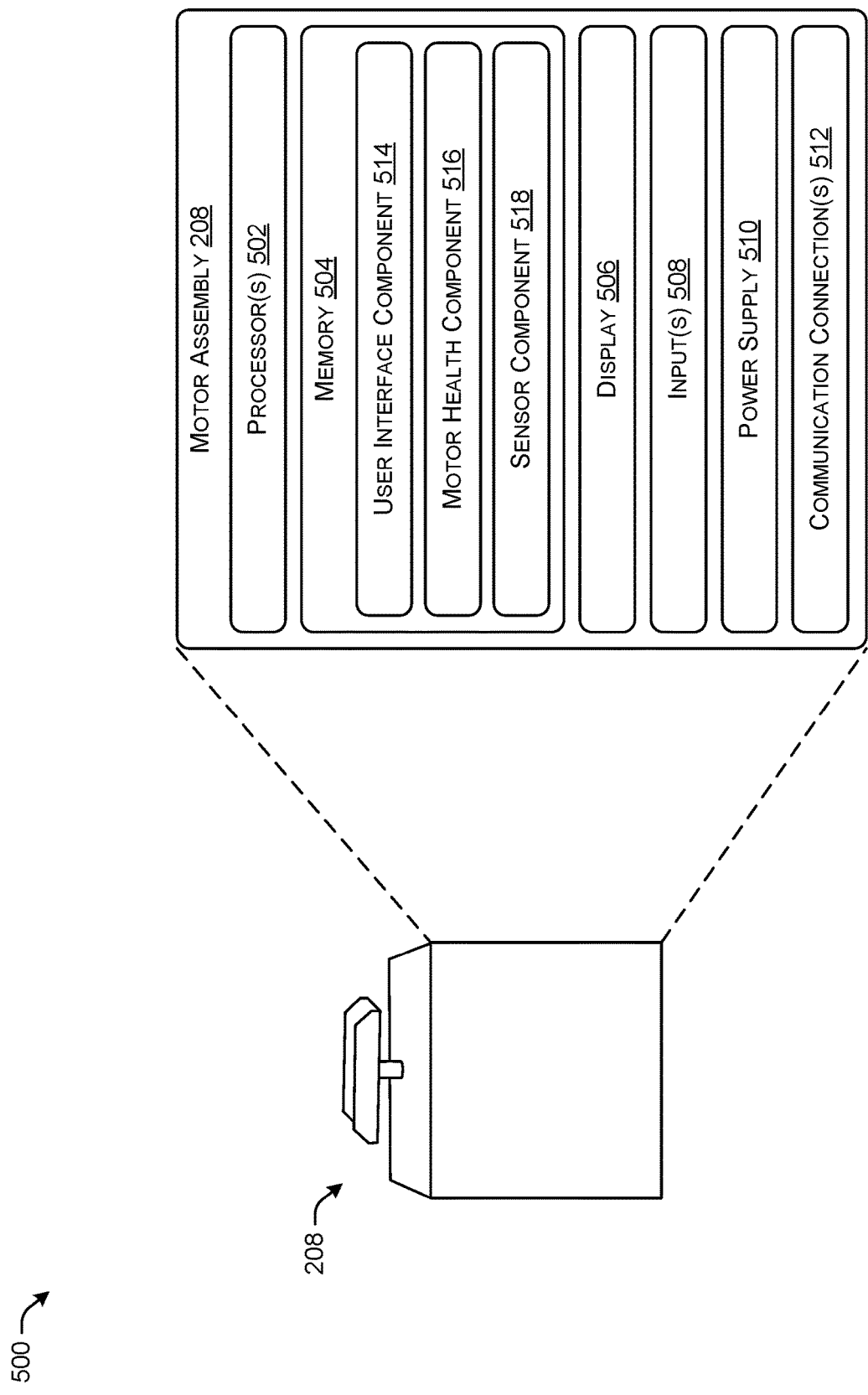
FIG. 5 is a block diagram illustrating example detail of an example motor assembly.

FIG. 5 is a block diagram 500 illustrating example detail of an example motor assembly 208. The motor assembly 208, in some examples, may include one or more processors 502 and memory 504 communicatively coupled with the one or more processors 502. In examples, the one or more processors 502 may execute instructions stored in the memory 504 to perform one or more operations on behalf of the motor assembly 208. Additionally, the motor assembly 208 may include a display 506, one or more inputs 508, a power supply 510, and one or more communication connections 512.

The memory 504 of the motor assembly 208 stores a user interface component 514, a motor health component 516, and a sensor component 518. The user interface component may generate and present, on the display 506, a user interface for controlling the motor assembly 208, such as setting feeding times, duration of feeding times, and the like. Additionally, or alternatively, the user interface component may present a user interface on a display of a mobile device associated with a user. In this way, a user may control the motor assembly 208 from his or her mobile device (e.g., cell phone, tablet, computer, etc.).

In some examples, the motor health component 516 may determine a status associated with the motor assembly 208, such as an amount of hours the motor assembly 208 has been actuated, an amount of voltage and/or current consumed by the motor assembly 208, an amount of battery life remaining, and the like.

The sensor component 518 may receive and/or process sensor data on behalf of the motor assembly 208. The sensor data may be generated by one or more sensors, such as the sensors 140 of the automatic feeder apparatus 100. The sensor data may include raw and/or processed sensor data. The sensor data may be indicative of, among other things, a proximity of an animal, an identity of an animal, an identity of an electronic device, a presence of an animal, and the like.

In some instances, aspects of some or all of the memory-stored components discussed herein can include any models, algorithms, and/or machine learning algorithms. For example, in some instances, components in the memory 504 such as the sensor component 518, motor health component 516, and/or user interface component 514 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The display 506 may of the motor assembly 208 may include any suitable display for presenting user interfaces, controlling operation of the motor assembly 208, and the like. For instance, the display 506 may comprise any one of an electroluminescent (ELD) display, a liquid crystal display (LCD), including both light-emitting diode (LED) backlit LCDs and/or thin-film transistor (TFT) LCDs, an LED display, OLED display, AMOLED display, plasma (PDP) display, and/or a quantum dot (QLED) display. The one or more inputs 508 may additionally or alternatively be used to control operation of the motor assembly 208. For instance, a user may use the one or more inputs 508 to select icons, scroll, or otherwise access features of a user interface that is presented on the display 506. The power supply 510 of the motor assembly may include one or more of a battery (e.g., lead-acid battery, lithium ion battery, etc.), a solar panel, a line voltage, and the like.

The communications connection(s) 512 can include physical and/or logical interfaces for connecting the motor assembly 208 to another computing device (e.g., a mobile device of a user, an electronic collar, etc.) and/or a network. For example, the communications connection(s) 512 can enable Wi-Fi-based communication such as via frequencies defined by the IEEE 702.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some examples, the communication connection(s) 512 may enable a user to wirelessly connect an electronic device. For instance, the user may wirelessly connect their smartphone to the motor assembly 208 via the communication connection(s) 512 and, for instance, using an application that is executing on the user's smartphone, wirelessly control the motor assembly 208.

The processor(s) 502 can be any suitable processor capable of executing instructions to process data and perform operations as described herein. By way of example and not limitation, the processor(s) 502 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 504 is an example of non-transitory computer-readable media. The memory 504 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

Figure 6:
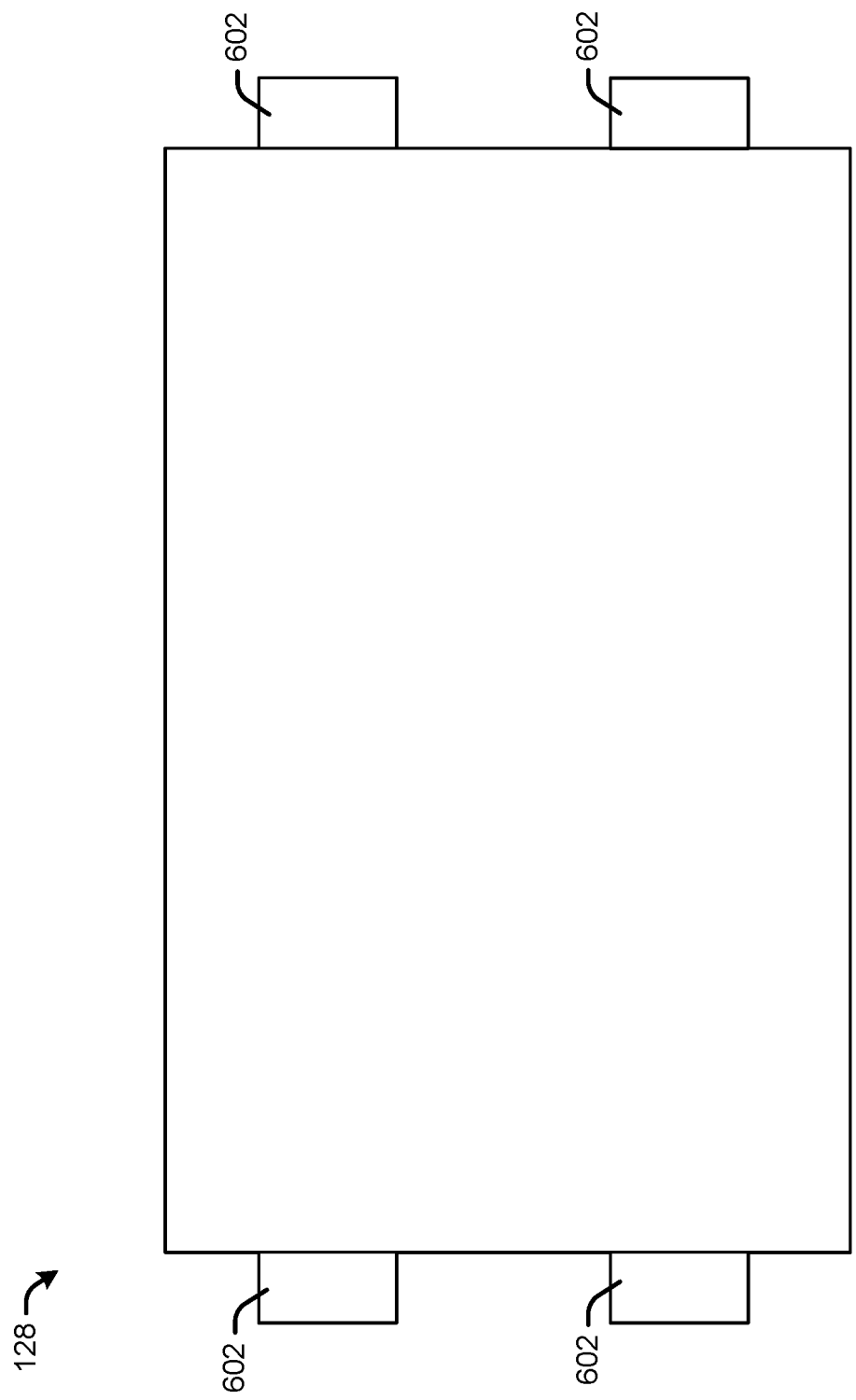
FIG. 6 illustrates a frontal view of an example interior panel/divider.

FIG. 6 illustrates a frontal view of an example interior panel 128. The interior panel 128 includes multiple flanges 602 that are configured to detachably couple the interior panel 128 from the feeder housing. It should be appreciated that the size of the interior panel 128 and the flanges 602 may not be to scale for exemplary purposes.

FIGS. 7A-7D illustrate side views of example feeder housings 106 including different example adjustment mechanisms for adjusting a position of an interior panel/divider, such as the interior panel 128 described above.

Figure 7A:
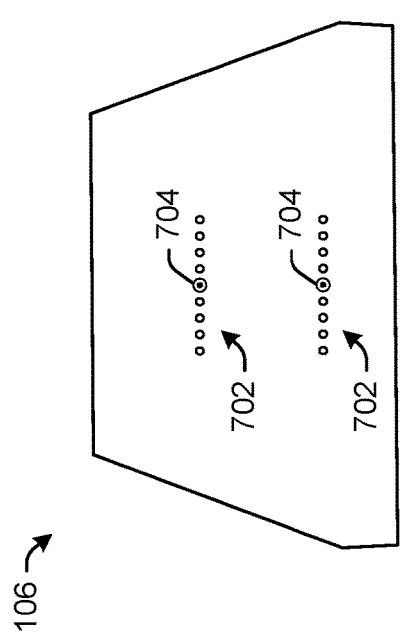
FIGS. 7A-7D illustrate side views of example feeder housings including different example adjustment mechanisms for adjusting a position of an interior panel/divider.
Figure 7B:
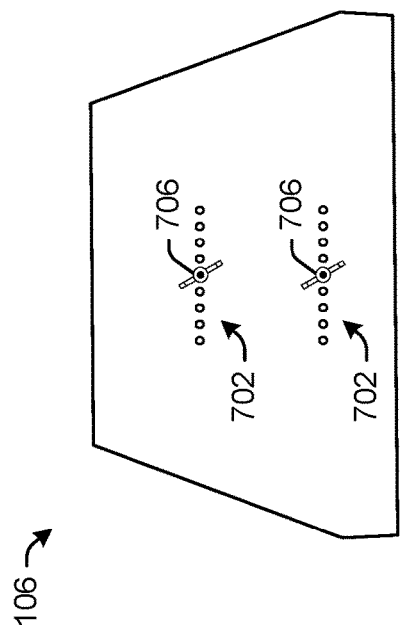

The example feeder housings 106 in FIGS. 7A and 7B include round connection points 702. The round connection points 702 may be configured such that a fastener screw 704 may be inserted through the round connection points 702 to couple with an interior panel/divider. Additionally, or alternatively, the round connection points 702 may be configured such that a male threaded rod or screw may be inserted through the round connection points 702 from an interior of the feeder housing 106 and secured using one or more wingnuts 706. For instance, the interior panel 128 shown in FIG. 6 may include threaded rod attached to the interior panel 128 instead of the flanges 602. Accordingly, the wingnuts 706 (or a similar device (e.g., nuts, clips, etc.)) may be used to couple the interior panel to the feeder housing 106.

Figure 7C:
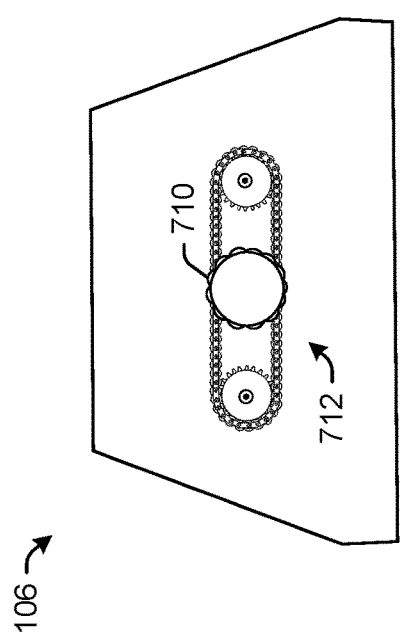
Figure 7D:
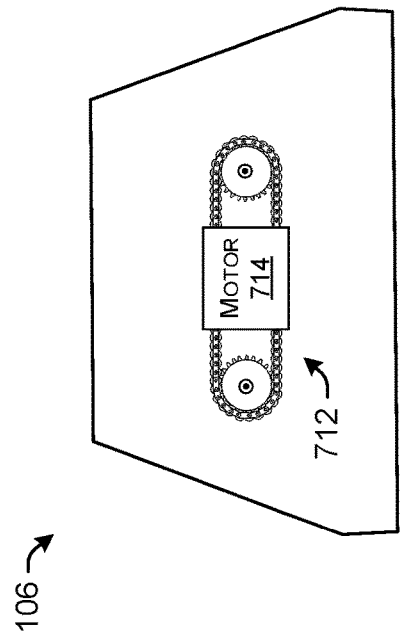

The example feeder housings 106 in FIGS. 7C and 7D include a track system 712 for adjusting an interior panel/divider. For instance, a chain of the track system 712 may be connected to the interior panel/divider and, when the hand crank 710 is rotated or the motor 714 actuates, the interior panel/divider may translate between a first side of the feeder housing 106 and a second side of the feeder housing 106 to adjust position.

Figure 8B:
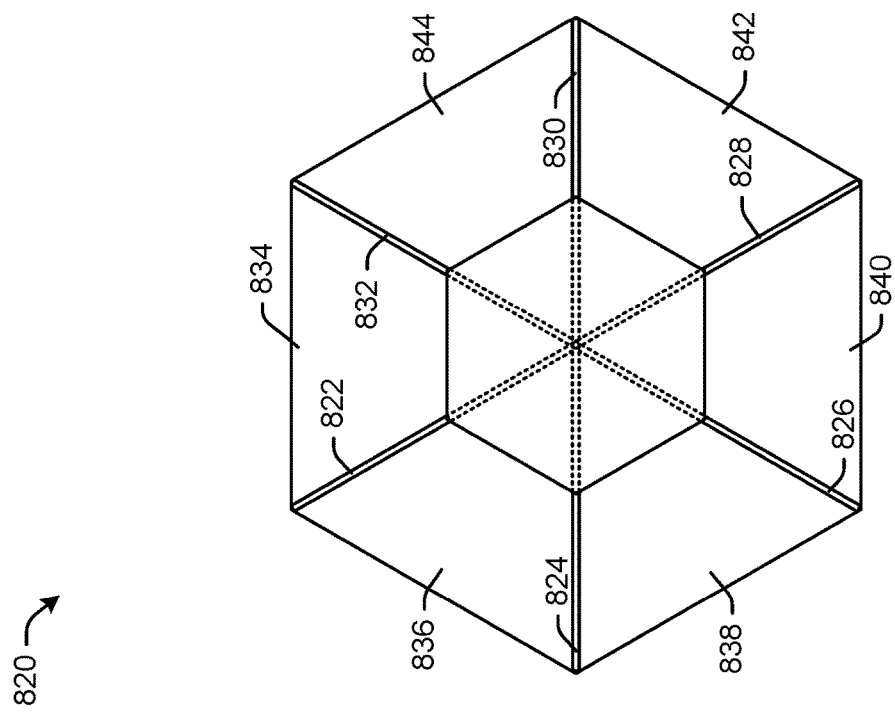
FIGS. 8A and 8B illustrate top-down views of different example feeder housing configurations to accommodate different numbers of animals.
Figure 8A:
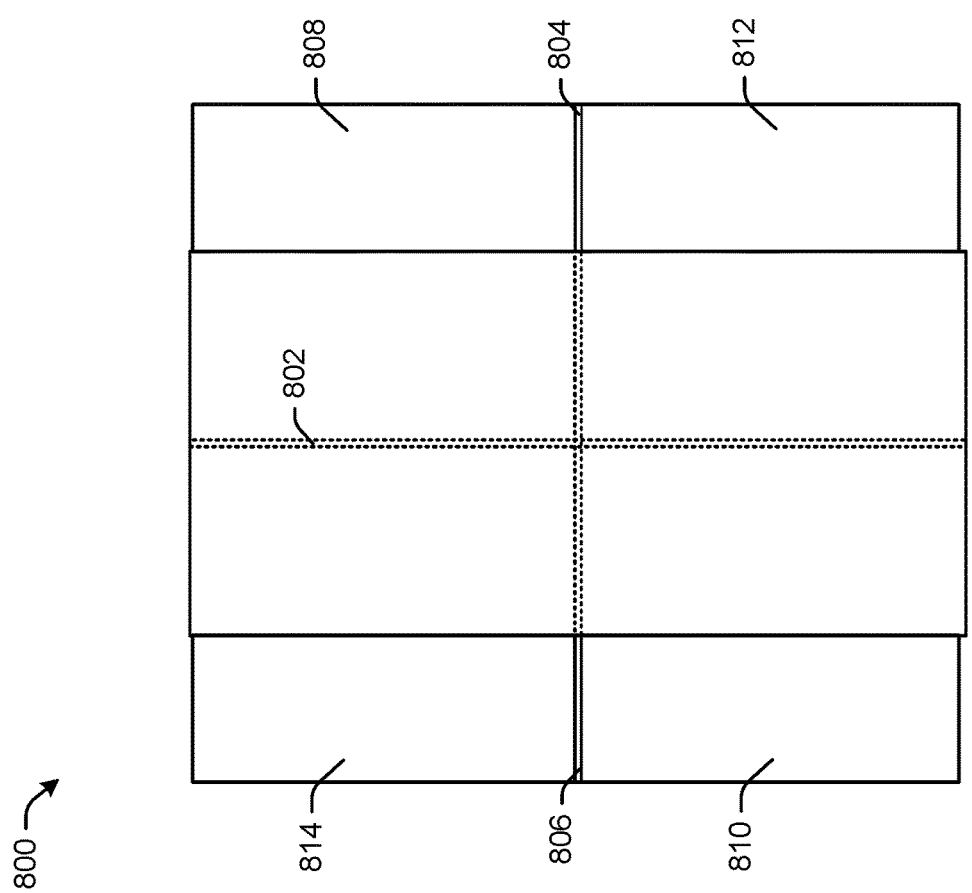

FIGS. 8A and 8B illustrate top-down views of different example feeder housing configurations to accommodate different numbers of animals. The feeder housing 800 of FIG. 8A includes a first interior panel/divider 802 that extends across the width of the feeder housing 800, a second interior panel/divider 804 that extends from a first side of the feeder housing 800 to the first interior panel/divider 802, and a third interior panel/divider 806 that extends from a second side of the feeder housing 800 opposite the first side and to the first interior panel/divider 806. In this way, the feeder housing 800 may include a first compartment 808, a second compartment 810, a third compartment 812, and a third compartment 814. In this way, up to four animals may be fed simultaneously using the feeder housing 800. Additionally, in some examples, any one of the first interior panel/divider 802, the second interior panel/divider 804, and/or the third interior panel/divider 806 may be removed to feed less animals.

The feeder housing 820 of FIG. 8B includes a first panel/divider 822, a second panel/divider 824, a third panel/divider 826, a fourth panel/divider 828, a fifth panel/divider 830, and a sixth panel/divider 832. The panels/dividers 822-832 may be coupled together at a center of the feeder housing 820. In this way, the feeder housing 820 may include a first compartment 834, a second compartment 836, a third compartment 838, a fourth compartment 840, a fifth compartment 842, and a sixth compartment 844. In some examples, each one of the first panel/divider 822, the second panel/divider 824, the third panel/divider 826, the fourth panel/divider 828, the fifth panel/divider 830, and the sixth panel/divider 832 may be removed and/or added to accommodate more or less animals.

Although FIGS. 8A and 8B illustrate feeder housings that include four or six feed compartments, it should be understood that similar techniques or apparatuses may be used to achieve a feeder housing including more or less feeder housings than that shown. For instance, a feeder housing may include any number of feed compartments, such as 1, 2, 3, 4, 5, 6, 7, 8, and so forth.

Figure 9:
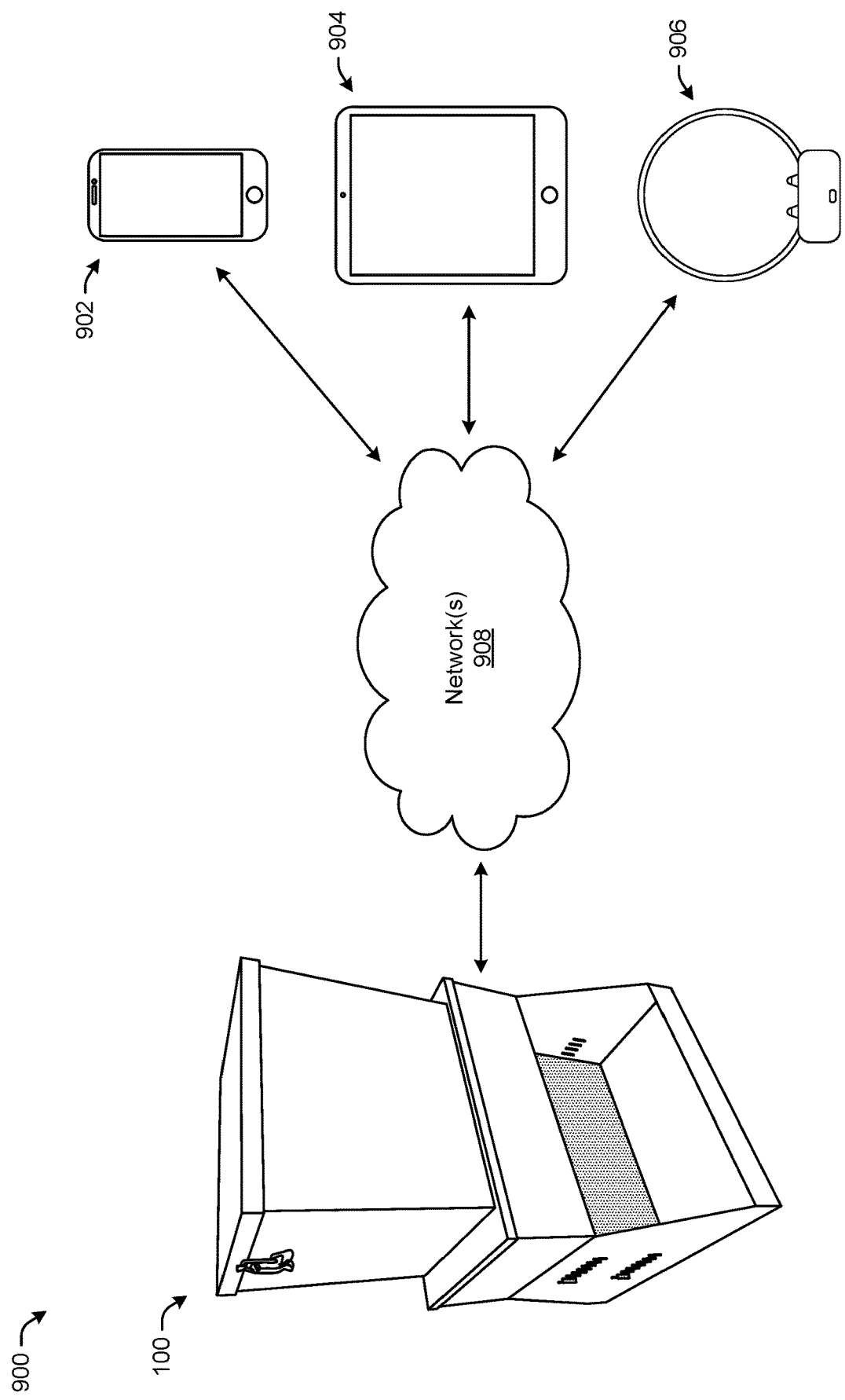
FIG. 9 illustrates an example environment 900 in which an example automatic feeder apparatus may communicate with one or more electronic devices.

FIG. 9 illustrates an example environment 900 in which an example automatic feeder apparatus 100 may communicate with one or more electronic devices. For example, a smartphone 902, tablet 904, and/or electronic collar 906 may communicate with the automatic feeder apparatus 100 via one or more networks 908. The one or more networks 908 may be capable of supporting one or more different types of wired and/or wireless network protocols, such as WIFI, Bluetooth, Bluetooth Low Energy (BLE), ZigBee, Cellular, RFID, and the like. In some examples, the automatic feeder apparatus 100 and/or a motor assembly of the automatic feeder apparatus 100 may include one or more processors, computer-readable media, and one or more communication connections. In this way, the automatic feeder apparatus 100 may communicate with the one or more electronic devices over the networks 908 as shown. In at least one example, the automatic feeder apparatus 100 may communicate with the electronic collar 906 to determine a proximity of the electronic collar with respect to the automatic feeder apparatus 100, a compartment of the automatic feeder apparatus 100, and the like.

Example Clauses

A. An apparatus comprising: a hopper; and a feeder housing comprising: a first portion coupled to the hopper, the first portion including a motor assembly configured to distribute contents stored within the hopper; and a second portion disposed below the first portion, the second portion comprising: a first compartment; a second compartment; and an interior panel separating the first compartment and the second compartment, wherein the interior panel is configured to translate between a first side of the second portion and a second side of the second portion opposite the first side to adjust a first volume of the contents received by the first compartment and a second volume of the contents received by the second compartment.

B. The apparatus as paragraph A recites, wherein the second portion of the feeder housing further comprises: a third side including a first set of connection points; a fourth side opposite the third side and substantially parallel to the third side, the fourth side including a second set of connection points; and wherein the interior panel is disposed between, and at an angle substantially perpendicular to, the third side and the fourth side, the interior panel being configured to removably couple with the third side and the fourth side via the first set of connection points and the second set of connection points.

C. The apparatus as any one of paragraphs A-B recites, wherein the first volume of the contents received by the first compartment is greater than the second volume of the contents received by the second compartment.

D. The apparatus as any one of paragraphs A-C recites, wherein at least one of the hopper or the feeder housing comprises an outlet or inlet such that the contents stored within the hopper may flow in a first direction from the hopper and into the feeder housing.

E. The apparatus as any one of paragraphs A-D recites, wherein the motor assembly, when actuated, distributes the contents into the first compartment and the second compartment in a second direction that is substantially perpendicular to the first direction.

F. The apparatus as any one of paragraphs A-E recites, wherein: the second portion comprises a base panel; the first side of the second portion comprises a first vertical flange extending upward from the base panel; and the second side of the second portion comprises a second vertical flange extending upward from the base panel.

G. The apparatus as any one of paragraphs A-F recites, wherein: the first compartment is disposed within the second portion of the feeder housing between the first side and the interior panel; the second compartment is disposed within the second portion of the feeder housing between the interior panel and the second side; the first side comprises a first opening to access contents received by the first compartment; and the second side comprises a second opening to access contents received by the second compartment.

H. The apparatus as any one of paragraphs A-G recites, further comprising: one or more processors; and one or more computer-readable media storing instructions that, when executed by the one or more processors, cause the one or more processors to perform operations comprising: establishing a wireless connection with an electronic device; receiving, via the wireless connection, an indication of a period of time during which the motor assembly is to distribute the contents; and sending a signal to the motor assembly during the period of time to cause the motor assembly to distribute the first volume of the contents and the second volume of the contents substantially simultaneously.

I. The apparatus as any one of paragraphs A-H recites, further comprising: one or more processors; and one or more computer-readable media storing instructions that, when executed by the one or more processors, cause the one or more processors to perform operations comprising: establishing a wireless connection with an electronic device; determining at least one of a predicted time or a predicted date at which contents stored within the hopper will be depleted; and sending an indication of the at least one of the predicted time or the predicted date to the electronic device.

J. The apparatus as any one of paragraphs A-I recites, further comprising: a sensor disposed proximate at least one of the first compartment or the second compartment; one or more processors; and one or more computer-readable media storing instructions that, when executed by the one or more processors, cause the one or more processors to perform operations comprising: receiving, from the sensor, data representing a proximity of an electronic device; determining that the proximity of the electronic device is within a threshold proximity; and based at least in part on the proximity of the electronic device being within the threshold proximity, sending a signal to the electronic device to cause the electronic device to perform an action.

K. An apparatus comprising: a hopper; and a feeder housing coupled to the hopper, the feeder housing comprising: an upper compartment including a motor assembly configured to distribute contents stored within the hopper; and a lower compartment configured to receive the contents, the lower compartment comprising: a divider separating the lower compartment into one or more sub-compartments, the one or more sub-compartments including at least a first sub-compartment and a second sub-compartment, wherein the divider is configured to adjust a volume of the contents distributed to each one of the one or more sub-compartments; a first side including a first opening to access the first sub-compartment; and a second side including a second opening to access the second sub-compartment.

L. The apparatus as paragraphs K recites, wherein the lower compartment of the feeder housing further comprises: a third side including a first set of connection points; a fourth side including a second set of connection points; and wherein the divider is disposed between the third side and the fourth side and is configured to removably couple with the third side and the fourth side via the first set of connection points and the second set of connection points to adjust the volume of the contents distributed to each one of the one or more sub-compartments.

M. The apparatus as any one of paragraphs K-L recites, wherein a first volume of the contents distributed to the first sub-compartment is greater than a second volume of the contents distributed to the second sub-compartment.

N. The apparatus as any one of paragraphs K-M recites, wherein at least one of the hopper or the feeder housing comprises an outlet or inlet such that the contents stored within the hopper may flow in a first direction from the hopper and into the feeder housing.

O. The apparatus as any one of paragraphs K-N recites, wherein the motor assembly, when actuated, distributes the contents into the lower compartment in a second direction that is substantially perpendicular to the first direction.

P. The apparatus as any one of paragraphs K-O recites, wherein: the lower compartment of the feeder housing comprises a base; the first side of the lower compartment comprises a first vertical flange extending upward from the base such that contents distributed to the first sub-compartment remain within the first sub-compartment; and the second side of the lower compartment comprises a second vertical flange extending upward from the base such that contents distributed to the second sub-compartment remain within the second sub-compartment.

Q. A system comprising: a hopper; a feeder housing comprising: an upper compartment including a motor assembly configured to distribute contents stored within the hopper; and a lower compartment configured to receive the contents distributed by the motor assembly, the lower compartment comprising: a divider separating the lower compartment into a first sub-compartment and a second sub-compartment, wherein the divider is configured to adjust a first volume of the contents distributed to the first sub-compartment and a second volume of the contents distributed to the second sub-compartment; one or more processors; and one or more computer-readable media storing instructions that, when executed by the one or more processors, cause the system to perform operations comprising: establishing a wireless connection with an electronic device; receiving, via the wireless connection, an indication of a period of time during which the motor assembly is to distribute the contents; and sending a signal to the motor assembly during the period of time to cause the motor assembly to distribute the contents to the one or more sub-compartments substantially simultaneously.

R. The system as paragraph Q recites, the operations further comprising: determining at least one of a predicted time or a predicted date at which contents stored within the hopper will be depleted; and sending an indication of the at least one of the predicted time or the predicted date to the electronic device.

S. The system as any one of paragraphs Q-R recites, further comprising one or more sensors, the operations further comprising: receiving, from the one or more sensors, data representing a proximity of an electronic device with respect to the first sub-compartment; determining that the proximity of the electronic device is within a threshold proximity; and based at least in part on the proximity of the electronic device being within the threshold proximity, sending a signal to the electronic device to cause the electronic device to perform an action.

T. The system as any one of paragraphs Q-S recites, wherein the electronic device comprises an electronic collar and the action comprises at least one of emitting a sound with the electronic collar, causing the electronic collar to vibrate, or causing the electronic collar to produce electrical stimulation.

While the example clauses described above are described with respect to one particular implementation, it should be understood that, in the context of this document, the content of the example clauses may also be implemented via a method, device, system, a computer-readable medium, and/or another implementation.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various operations that are described herein need not be performed in the order disclosed, and other examples using alternative orderings of the operations could be readily implemented. In addition to being reordered, the operations could also be decomposed into sub-operations with the same results.

What is claimed is:

1. An apparatus comprising:
   a hopper for containing contents of a substance; and
   a feeder housing comprising:
      an upper portion coupled to the hopper and defining a first volumetric space, the upper portion including a motor assembly located within the first volumetric space that is configured to distribute an amount of the contents from the hopper; and
      a lower portion defining a second volumetric space disposed below the first volumetric space, the lower portion comprising:
         a first compartment defining a third volumetric space within the second volumetric space;
         a second compartment defining a fourth volumetric space within the second volumetric space; and
         an interior panel within the second volumetric space and positioned vertically along a vertical axis such that the interior panel separates the first compartment and the second compartment, the interior panel disposed below the motor assembly and configured to translate along a horizontal axis between a first side of the lower portion and a second side of the lower portion opposite the first side to simultaneously adjust at least:
            a first size of the first compartment and a second size of the second compartment; and
            a ratio of the amount of the contents distributed into each of the first compartment and the second compartment.

2. The apparatus of claim 1, wherein the lower portion of the feeder housing further comprises:
   a third side including one or more first connection points; and
   a fourth side opposite the third side and substantially parallel to the third side, the fourth side including one or more second connection points;
   wherein the interior panel is disposed between, and at an angle substantially perpendicular to, the third side and the fourth side, the interior panel configured to detachably couple to the third side and the fourth side via the one or more first connection points and the one or more second connection points.

3. The apparatus of claim 1, wherein a first amount of the contents received by the first compartment is greater than a second amount of the contents received by the second compartment.

4. The apparatus of claim 1, wherein:
   the lower portion comprises a base panel;
   the first side of the lower portion comprises a first vertical flange extending upward from the base panel; and
   the second side of the lower portion comprises a second vertical flange extending upward from the base panel.

5. The apparatus of claim 1, wherein:
   the first compartment is disposed within the lower portion of the feeder housing between the first side and the interior panel;
   the second compartment is disposed within the lower portion of the feeder housing between the interior panel and the second side;
   the first side comprises a first opening to access the contents received by the first compartment; and
   the second side comprises a second opening to access the contents received by the second compartment.

6. The apparatus of claim 1, further comprising:
   one or more processors; and
   one or more computer-readable media storing instructions that, when executed by the one or more processors, cause the one or more processors to perform operations comprising:
      establishing a wireless connection with an electronic device;
      receiving, via the wireless connection, an indication of a period of time during which the motor assembly is to distribute the amount of the contents; and
      sending a signal to the motor assembly during the period of time to cause the motor assembly to distribute the amount of the contents.

7. The apparatus of claim 1, further comprising:
   one or more processors; and
   one or more computer-readable media storing instructions that, when executed by the one or more processors, cause the one or more processors to perform operations comprising:
      establishing a wireless connection with an electronic device;
      determining at least one of a predicted time or a predicted date at which the contents contained within the hopper will be depleted; and
      sending an indication of the at least one of the predicted time or the predicted date to the electronic device.

8. The apparatus of claim 1, further comprising:
   a sensor disposed proximate at least one of an opening of the first compartment or the second compartment;
   one or more processors; and
   one or more computer-readable media storing instructions that, when executed by the one or more processors, cause the one or more processors to perform operations comprising:
      receiving, from the sensor, data representing a proximity of an electronic device;

determining that the proximity of the electronic device is within a threshold proximity; and based at least in part on the proximity of the electronic device being within the threshold proximity, sending a signal to the electronic device to cause the electronic device to perform an action.

9. The apparatus of claim 1, further comprising a passage disposed between a bottom surface of the hopper and a top surface of the feeder housing, the passage configured to facilitate movement, in a first direction, of the contents from the hopper and into the feeder housing, wherein the motor assembly, when actuated, distributes the contents into the first compartment and the second compartment by causing the contents to flow in a second direction that is substantially perpendicular to the first direction.

10. The apparatus of claim 9, wherein the motor assembly includes an agitator extending from the motor assembly and at least partially into the passage to facilitate continuous flow of the contents from the hopper and into the feeder housing while the motor assembly is actuated.

11. An apparatus comprising:
a hopper for containing contents of a substance; and
a feeder housing coupled to a bottom portion of the hopper, the feeder housing comprising:
  a motor assembly located within a first volumetric space within the feeder housing, the motor assembly configured to distribute an amount of the contents from the hopper; and
  a divider located within a second volumetric space within the feeder housing that is below the first volumetric space, the divider oriented substantially vertically along a vertical axis to divide the second volumetric space into at least a third volumetric space and a fourth volumetric space, wherein the divider is configured to translate substantially linearly in at least one direction along a horizontal axis to simultaneously adjust at least:
    sizes of the third volumetric space and the fourth volumetric space; and
    a ratio in which a first portion of the amount of the contents and a second portion of the amount of the contents are distributed into the third volumetric space and the fourth volumetric space.

12. The apparatus of claim 11, wherein the first portion of the amount of the contents is greater than the second portion of the amount of the contents.

13. The apparatus of claim 11, wherein at least one of the hopper or the feeder housing comprises an outlet or inlet such that the contents contained within the hopper may flow in a first direction from the hopper and into the feeder housing.

14. The apparatus of claim 13, wherein the motor assembly, when actuated, distributes the contents into the third volumetric space and the fourth volumetric space of the second volumetric space in a second direction that is substantially perpendicular to the first direction.

15. The apparatus of claim 11, wherein:
the feeder housing comprises a base;
a first side of the feeder housing comprises a first vertical flange extending upward from the base such that the first portion of the amount of the contents distributed to the third volumetric space remain within the third volumetric space; and
a second side of the feeder housing comprises a second vertical flange extending upward from the base such that the second portion of the amount of the contents distributed to the fourth volumetric space remain within the fourth volumetric space.

16. A system comprising:
a hopper;
a feeder housing comprising:
  an upper compartment defining a first volumetric space, the upper compartment including a motor assembly configured to distribute contents stored within the hopper; and
  a lower compartment defining a second volumetric space disposed below the first volumetric space, the lower compartment configured to receive the contents distributed by the motor assembly, the lower compartment comprising:
    a divider separating the lower compartment into at least a first sub-compartment and a second sub-compartment, the first sub-compartment defining a third volumetric space within the second volumetric space and the second sub-compartment defining a fourth volumetric space within the second volumetric space, wherein the divider is configured to translate linearly along a horizontal axis to simultaneously adjust a ratio of a first volume of the contents distributed to the first sub-compartment, and a second volume of the contents distributed to the second sub-compartment;
one or more processors; and
one or more computer-readable media storing instructions that, when executed by the one or more processors, cause the system to perform operations comprising:
  establishing a wireless connection with an electronic device;
  receiving, via the wireless connection, an indication of a time at which the motor assembly is to distribute the contents; and
  sending a signal to the motor assembly at the time to cause the motor assembly to distribute the contents to the first sub-compartment and the second sub-compartment substantially simultaneously.

17. The system of claim 16, the operations further comprising:
determining at least one of a predicted time or a predicted date at which the contents stored within the hopper will be depleted; and
sending an indication of the at least one of the predicted time or the predicted date to the electronic device.

18. The system of claim 16, further comprising one or more sensors, the operations further comprising:
receiving, from the one or more sensors, data representing a proximity of a second electronic device with respect to the first sub-compartment;
determining that the proximity of the second electronic device is within a threshold proximity; and
based at least in part on the proximity of the second electronic device being within the threshold proximity, sending a signal to the second electronic device to cause the second electronic device to perform an action.

19. The system of claim 18, wherein the second electronic device comprises an electronic collar and the action comprises at least one of emitting a sound, vibrating, or electrical stimulation.

* * * * *